United States Patent [19]

Adams

[11] Patent Number: 5,000,637

[45] Date of Patent: Mar. 19, 1991

[54] FASTENING DEVICE WITH CIRCUMFERENTIAL RIBS AND METHOD FOR MANUFACTURING THE SAME

[75] Inventor: William E. Adams, Butler, Pa.

[73] Assignee: Adams Mfg., Portersville, Pa.

[21] Appl. No.: 554,738

[22] Filed: Jul. 18, 1990

Related U.S. Application Data

[63] Continuation of Ser. No. 129,542, Dec. 7, 1987, abandoned.

[51] Int. Cl.⁵ ............................................. F16B 19/00
[52] U.S. Cl. ..................................... 411/339; 411/366; 411/510; 411/908; 411/947
[58] Field of Search ............... 411/907, 908, 947, 411, 411/414, 324, 301, 339, 508–510, 366, 436

[56] References Cited

U.S. PATENT DOCUMENTS

| | | | |
|---|---|---|---|
| 2,086,568 | 7/1937 | McIntyre | 411/366 |
| 3,000,066 | 9/1961 | Cochran | 411/908 X |
| 3,255,795 | 6/1966 | Ginsburg | 411/324 X |
| 3,508,593 | 4/1970 | Gill | 411/947 X |
| 3,577,603 | 5/1971 | Seckerson | 411/510 |
| 3,764,446 | 10/1973 | Martin | 411/339 X |
| 4,478,545 | 10/1984 | Mizusawa et al. | 411/908 X |
| 4,555,206 | 11/1985 | Sweeney | 411/23 |
| 4,670,136 | 6/1987 | Schmidt et al. | 411/339 X |
| 4,743,048 | 5/1988 | Groswith, III | 411/509 X |
| 4,759,670 | 7/1988 | Linder et al. | 411/908 X |
| 4,761,860 | 8/1988 | Krauss | 411/339 X |
| 4,932,818 | 6/1990 | Garwood | 411/366 |

FOREIGN PATENT DOCUMENTS

| | | | |
|---|---|---|---|
| 651985 | 11/1962 | Canada | 411/510 |
| 2636916 | 2/1978 | Fed. Rep. of Germany | 411/510 |
| 204377 | 11/1965 | Sweden | 411/510 |
| 0745788 | 2/1956 | United Kingdom | 411/908 |
| 797380 | 7/1958 | United Kingdom | 411/908 |
| 1550814 | 8/1979 | United Kingdom | 411/366 |
| 1564904 | 4/1980 | United Kingdom | 411/411 |

Primary Examiner—Lloyd A. Gall
Attorney, Agent, or Firm—Buchanan Ingersoll

[57] ABSTRACT

A fastening device uses a ribbed rivet to secure two materials together. The ribs on the rivet should have a height no greater than 0.005 inches on most plastics and be of a close proximity. This rivet can be pushed directly into, or pulled directly out of, a ribbed receiving bore without fear of stripping the threaded ribs. The rivet can be manufactured in a two-piece injection plastic mold in which the rivet is fully formed in the lower half of the mold. Because of the height and proximity of the ribs, the rivet can be removed from the mold without stripping the threaded ribs. Furthermore, the rivet can be formed in the same injection molding operation used to manufacture the receiving bore into which it is to be inserted.

7 Claims, 1 Drawing Sheet

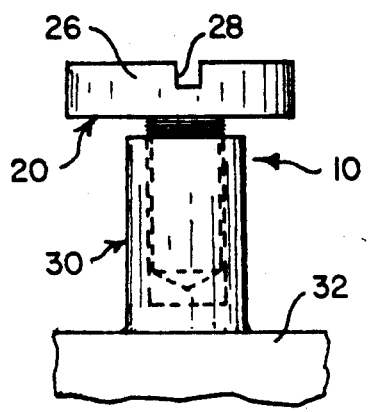
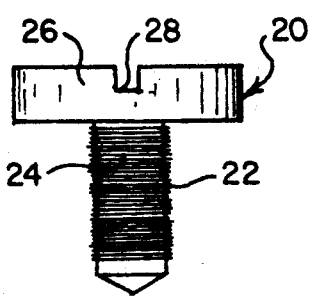
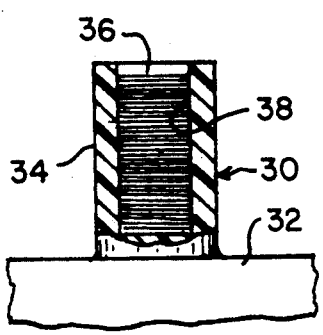
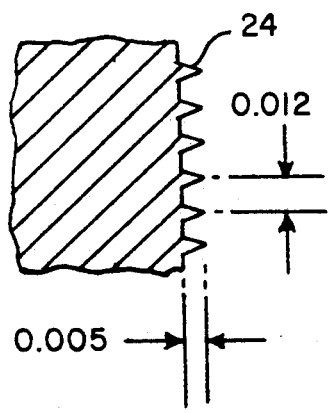
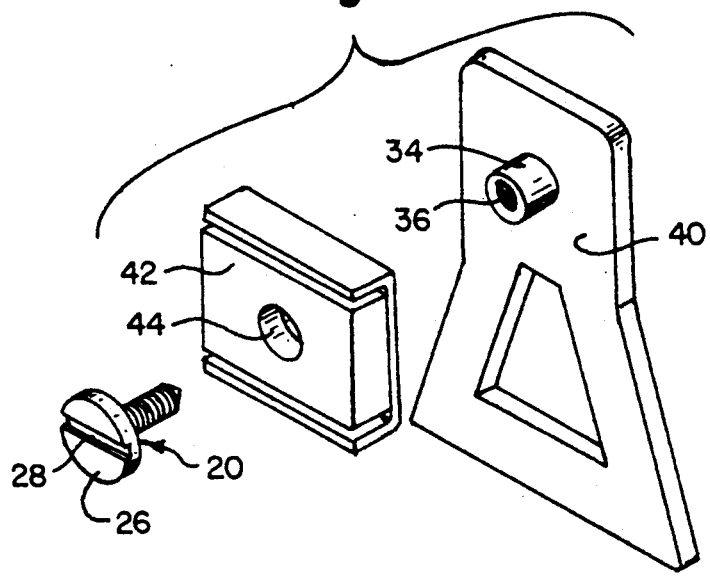
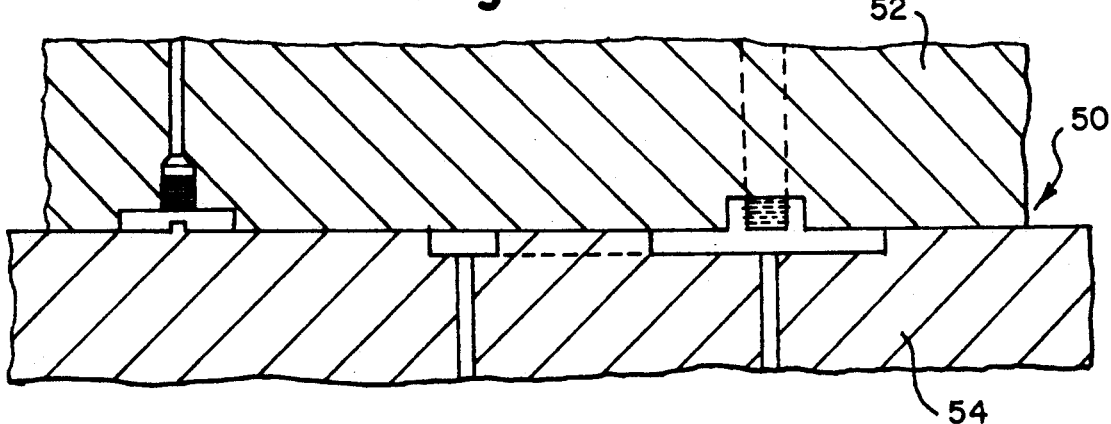

FASTENING DEVICE WITH CIRCUMFERENTIAL RIBS AND METHOD FOR MANUFACTURING THE SAME

This application is a continuation of application Ser. No. 129,542, filed Dec. 7, 1987, now abandoned.

BACKGROUND OF THE INVENTION

1. Field of the Invention

The present invention relates to the field of fastening devices and more particularly to the field of plastic rivets and their receivers.

2. Background of the Invention

It is well known in the art to employ rivets to fasten materials together. Generally, the rivet is of a cylindrical shape. It may be passed through an object and either flattened or inserted into a receiving member particularly adapted to receive it. The latter type of rivet is secured within the receiving member and the combination of these secured pieces is used to fasten together a number of different objects.

It is also well known to use threaded members, such as screws, to fasten together two or more objects. Care must be taken in the insertion and extraction of these threaded members in order that the threads not be stripped. If its threads are stripped, the threaded member can no longer function as a fastener. When the threaded member is formed from an injection molded plastic, two molds applied parallel to the rod member must be utilized. Only by this alignment of the molds can a threaded member be released from its molds without stripping its threads. Furthermore, the threads on the female cavity can only be formed by an expensive molding process in which the mold rotates out of the cavity after the molded cavity cools.

When manufacturing an object, it is preferred, for cost purposes, that all components, including the fastener, be produced in one operation. This creates difficulty when the object to be fastened is formed from injection molded plastic and the desired fastener is a conventional threaded rod member that is aligned perpendicular to the object to be fastened. If such an object is made in a two-piece mold, the fastener must fully extend into one half of the mold. When the mold separates to release the object, the threads are stripped as the object is removed from the mold. Consequently, there is a need for a fastener that can be fully formed in one part of a mold and removed from a mold without stripping and a method for its production. Moreover, such fastener should be strong enough to support the object being molded when subjected to forces from all directions.

SUMMARY OF THE INVENTION

In accordance with the present invention, there is provided a rivet which is formed from an injection molded plastic. The rivet is provided with a series of circumferential or angled ribs, or threads on its outer surface. These ribs should have a height no greater than 0.005 inches, and should be no more than 0.012 inches apart. The rivet fits into a receiving member which has a generally cylindrical bore provided therein and is adapted to receive and hold the rivet in a securely fastened position. A series of comparable ribs are provided about the interior of the bore. The rivet can be inserted into the receiving means by either pushing the rivet directly into the bore or by threading the rivet into the bore. This causes the ribs of the rivet and the ribs of the receiving member to engage one another. Because of the small height of the ribs and their proximity to one another, the rivet will not be stripped during either its insertion into the receiving member or extraction from the mold. After fastening, the rivet will support the object of which it is a part against forces from all directions.

The ribbed rivet of this invention can be manufactured in the same injection molding operation as the object to be fastened. A two-piece mold is used in which the formed rivet extends into one of the molds. The rivet can be released from this mold without stripping because of the height and proximity of the ribs.

Preferably, the rivet, receiving member or both are an integral part of another object which is molded at the same time. The rivet means, receiving member or both are integrally molded to a face of the object. If desired, the rivet can be molded separately. In that event, the rivet can be provided with a head which facilitates the insertion and removal of the rivet from the receiving member. The head can be adapted to receive either a screwdriver, a pair of pliers, or other like device which assists in either turning, pushing in, or pulling out the rivet.

Alternatively, the rivet may be formed from a relatively hard material and the receiving means formed from a softer material This combination of materials allows the ribs to securely attach to the bore of the receiving means and provides superior fastening performance. I find that a rivet formed from a polycarbonate material and a receiving means formed from a polypropylene material provides excellent fastening performance.

An important consideration in the use of plastics is the property of the plastic to shrink when it cools. Because every plastic shrinks differently, there are a select number of plastics that provide optimal performance for a given application. For example, polypropylene shrinks more than polystyrene. Therefore, polypropylene or other high-shrink plastics should be used for making receiving members in those applications where it is necessary to use a higher-shrinking plastic to strengthen the bond between the rivet and the receiving member. By determining which plastics can be used for a given application, the cheapest plastic can be selected which is sufficient for performing the application at hand. A particularly useful application for a higher-shrinking plastic is to provide a greater height for the ribs. Plastic members may be joined together while the plastic is still warm, before it has shrunk to attain maximum holding power. It is very common to assemble plastic parts at the press whole the plastic is still warm, Additionally, by beveling the rings, shrinkage can force the two parts even more closely together.

BRIEF DESCRIPTION OF THE DRAWINGS

FIG. 1 is a side elevational view of a present preferred embodiment of my fastening device.

FIG. 2 is a side elevational view of the rivet portion of the fastening device of FIG. 1.

FIG. 3 is a side elevational view partly in section of the receiving member portion of the fastening device of FIG. 1.

FIG. 4 is a fragmentary view in section of the ribs on the rivet portion of the fastening device of FIG. 1 shown in enlarged scale.

FIG. 5 is an exploded view of the fastening device of FIG. 1 used to attach a magnet to a molded holder.

FIG. 6 is a cross-sectional view of the two-piece mold in which the rivet portion and holder of the fastening device of FIG. 1 are produced.

DESCRIPTION OF THE PREFERRED EMBODIMENT

As shown in FIGS. 1 through 3, fastening device 10 has two major parts: rivet means 20 and receiving means 30, into which rivet means 20 can be inserted. Rivet means 20 primarily comprises an elongated rod member 22. Preferably, rod member 22 is pointed to facilitate its insertion into receiving means 30. Ribs 24 are provided about the outer surface of rod member 22. As shown in FIG. 4, the ribs 24 are preferably no greater than 0.005 inches in height and have a proximity to one another of less than 0.012 inches, depending on the plastic. I have found that a ¼ inch rivet having 48 ribs per inch provides superior holding power in most plastics. In soft vinyls, more ribs may be used; in higher polycarbons, fewer.

Head member 26 is affixed to that end of rod member 22 which is not inserted into receiving means 30. Removal means such as a slot 28 or a tab (not shown) can be provided on head member 26 to facilitate in the removal of rivet means 20 from receiving means 30. A screwdriver or pliers or the like can be used in conjunction with the removal means when removing the rivet means 20. A flat head should be provided if the rivet is not intended to be removed.

Preferably, receiving means 30 comprises a base member 32 from which neck member 34 extends. Bore 36 is provided within neck member 34 and is adapted to receive rod member 22 of rivet means 20. Ribs 24 of rod member 22 act against the inner ribbed surface 38 of bore 36 to securely fasten the rivet means 20 to the receiving means 30. The grooves between the ribs on inner ribbed surface 38 can be either rounded or angled so as to provide the best fit.

Because of the small height of ribs 24, and their proximity to one another, rivet means 20 can be inserted into receiving means 30 by pushing rod member 22 into bore 36. The ribs 24 are small enough and flexible enough that they will not be stripped by a direct insertion action. Likewise, rivet means 20 can be removed from receiving means 30 either by screwing or directly pulling rod member 22 out of bore 36 without stripping the ribs 24.

I have found that a rivet means 20 wherein the ribs 24 have a height of 0.004 inches provides the best securing performance. If ribs 24 larger than 0.005 inches in height are used, problems occur in removing the rivet means from the mold and inserting the rivet means into the receiving means. If ribs 24 smaller than about 0.002 inches in height are used, problems occur in providing sufficient gripping strength to securely fasten the rivet means to the receiving means.

FIG. 5 shows my fastening device 10 in operation. The receiving means is comprised of neck member 34 formed on a first object to be fastened, such as frame member 40. A second object to be fastened, such as magnet 42, is provided with a bore 44 having a diameter at least as great as the diameter of the neck member 34. The magnet 42 is placed over the neck member 34 of the frame member 40 and rivet means 20 is inserted into bore 36. The magnet 42 is firmly secured between head member 26 and the frame 40, thereby fastening magnet 42 to the frame member 40. My fastening device 10 is strong enough to support magnet 42 on frame member 40 when subjected to a force from any direction.

In addition to providing superior fastening performance, the ribbed design of my fastening device also facilitates in its manufacture. As shown in FIG. 6, neck member 34 is formed on frame member 40 and rivet means 20 is separately formed from injection molded plastic within a two-piece mold 50. Frame member 40 can have any size or shape that can be formed in a two-piece injection molding process.

The pieces to be formed are aligned in the mold such that upper half 52 and lower half 54 of two-piece mold 50 are parallel to the longitudinal axis of frame member 40 and perpendicular to the longitudinal axis of rivet means 20 and the longitudinal axis of neck member 34. Rivet means 20 is fully formed in the upper half 52. Neck member 34 is also formed in upper half 52 of mold 50, but the attached frame 40 is formed in the lower half 54 of the mold 50.

Rivet means 20 is removed from the upper half 52 of mold 50 by directly pulling the rod member 22 out from the upper half 52 of the mold. Likewise, neck member 34 is removed by pulling it directly out from upper half 52 of mold 50. Because of the small height of the ribs 24 and their proximity to one another, there is no danger that the ribs 24 will strip because of the pulling action. This ability to be pulled directly out from the mold enables the rivet means 20 of my invention to be produced in the same injection molding operation as the object to be fastened.

Rivet means 20 can be formed from a polycarbonate material or other relatively hard plastic. This provides a tight securing force to be exerted by ribs 24 upon inner ribbed surface 38 of bore 36. Receiving means 30 can then be formed from a polyethylene material or other relatively soft plastic. A soft plastic receiving means 30 permits the ribs 24 to push into inner ribbed surface 38 of bore 36 to provide a tighter securing force.

While I have shown and described a present preferred embodiment of the invention, it is to be distinctly understood that the invention is not limited thereto but may be otherwise variously embodied and practiced within the scope of the following claims.

I claim:

1. A molded object and integral fastening means comprised of:
    (a) a body having at least two faces, each face being formed by one piece of a mold, and
    (b) one of a rivet means and a receiving means integrally molded to one of the faces of the body,
    said rivet means comprising a generally elongated rod member, said rod member having a plurality of circumferential ribs provided on its outer surface, said ribs having a height no greater than 0.005 inches and a proximity to one another of [0.0012] less than 0.012 inches;
    said receiving means having a generally cylindrical bore provided therein, said bore provided with a plurality of continuous circumferential ribs and adapted to receive said rivet means and hold said rivet means in a securely fastened position, wherein said rivet means is inserted into said receiving means by one of pushing said rivet means directly into said bore and pushing and rotating said rivet means in said bore and said rivet means is removed from said receiving means by one of pulling said rivet means directly out of said bore and pulling and rotating said rivet means in said bore.

2. The fastening means in claim 1 wherein said rivet means further comprises a head member attached to an end of said rod member.

3. The fastening means in claim 1 wherein said head member has a size and shape adapted to receive one of a screwdriver or a pair of pliers.

4. The fastening means in claim 1 wherein the receiving means further comprises a base member and a neck member attached thereto, said neck member having a generally cylindrical bore provided therein, said bore adapted to receive said rivet means and hold said rivet means in a securely fastened position, when said rivet means is inserted into said neck member.

5. The fastening means in claim 1 wherein said fastening means secures at least one object to be fastened and at least one of said rivet means and said receiving means is formed integrally with said object to be fastened.

6. The fastening means in claim 1 wherein said rivet means and said receiving means are formed during the same injection molding operation.

7. The fastening means in claim 1 wherein said rivet means is formed from a polycarbonate material and said receiving means is formed from a polyethylene material.

* * * * *

UNITED STATES PATENT AND TRADEMARK OFFICE
CERTIFICATE OF CORRECTION

PATENT NO. : 5,000,637
DATED : March 19, 1991
INVENTOR(S) : William E. Adams It is certified that error appears in the above-identified patent and that said Letters Patent is hereby corrected as shown below:

Column 4, line 57, claim 1, delete "[ 0.0012 ]".

Signed and Sealed this

Fifteenth Day of December, 1992

*Attest:*

DOUGLAS B. COMER

*Attesting Officer*     *Acting Commissioner of Patents and Trademarks*